US012586188B2

(12) United States Patent
    Destainville et al.

(10) Patent No.: US 12,586,188 B2
(45) Date of Patent: Mar. 24, 2026

(54) METHOD AND DEVICE FOR GENERATING A THREE-DIMENSIONAL SYNTHETIC IMAGE FROM A THREE-DIMENSIONAL INPUT IMAGE

(71) Applicant: Abys Medical, La Rochelle (FR)

(72) Inventors: Arnaud Destainville, Saint-Xandre (FR); Olivier Richart, Le Bois Plage en Ré (FR); Jean-Marie Housseau, La Rochelle (FR); Abdelbasset Brahim, La Rochelle (FR); Ismail Okieh Omar, La Rochelle (FR); Marwa Abderrahim, La Rochelle (FR)

(73) Assignee: Abys Medical, La Rochelle (FR)

( * ) Notice: Subject to any disclaimer, the term of this patent is extended or adjusted under 35 U.S.C. 154(b) by 299 days.

(21) Appl. No.: 18/524,567

(22) Filed: Nov. 30, 2023

(65) Prior Publication Data

US 2025/0182269 A1       Jun. 5, 2025

(51) Int. Cl.
    *G06T 7/00*          (2017.01)
    *G06T 3/40*          (2024.01)
    *G06T 7/12*          (2017.01)
    *G06T 15/00*         (2011.01)

(52) U.S. Cl.
    CPC .............. *G06T 7/0012* (2013.01); *G06T 3/40* (2013.01); *G06T 7/12* (2017.01); *G06T 15/00* (2013.01); *G06T 2207/20084* (2013.01); *G06T 2207/20132* (2013.01); *G06T 2207/30008* (2013.01)

(58) Field of Classification Search
    CPC .......... G06T 7/0012; G06T 7/12; G06T 3/40; G06T 15/00; G06T 2207/20132; G06T 2207/20084; G06T 2207/30008

USPC ......................................................... 382/128
    See application file for complete search history.

(56) References Cited

U.S. PATENT DOCUMENTS

| | | | |
|---|---|---|---|
| 8,600,124 B2 * | 12/2013 | Arnaud ................. | A61B 6/505 |
| | | | 382/128 |
| 2019/0021677 A1 * | 1/2019 | Grbic ....................... | G06T 7/11 |

OTHER PUBLICATIONS

Dubey, S. R., et al., "Activation Functions in Deep Learning: A Comprehensive Survey and Benchmark," Jun. 28, 2022, 18 pages.
Bank, D., et al., "Autoencoders," Apr. 2, 2021, 22 pages.
Pinaya, W. H., et al., "Brain Imaging Generation with Latent Diffusion Models," Sep. 15, 2022, 10 pages.

(Continued)

*Primary Examiner* — Allen H Nguyen
(74) *Attorney, Agent, or Firm* — Cushman Partners, LLC

(57) ABSTRACT

A method for generating a 3D synthetic image from a 3D input image, includes receiving a 3D input image representing a part of a body of a subject, which includes a bone portion, converting the 3D input image into a first vector presenting dimensions lower than dimensions of the 3D input image, determining, using a diffusion module, a modified vector by applying a diffusion processing to the first vector, the modified vector corresponding to a noisy representation of the first vector, determining, using a reverse diffusion module, a second vector by applying a reverse diffusion processing to the modified vector, the second vector corresponding to a denoised representation of the modified vector, and converting the second vector into a 3D synthetic image that presents the same dimensions as the 3D input image, the 3D synthetic image representing the part of the body of the subject that includes the bone portion.

17 Claims, 8 Drawing Sheets

50

(56) References Cited

OTHER PUBLICATIONS

Sun, L., et al., "Hierarchical Amortized GAN for 3D High Resolution Medical Image Synthesis," IEEE Journal of Biomedical and Health Informatics, vol. 26, No. 8, Aug. 2022, pp. 3966-3975.
Zhang, R., et al., "The Unreasonable Effectiveness of Deep Features as a Perceptual Metric," Computer Vision Foundation, (Year: 2018), pp. 586-595.

* cited by examiner

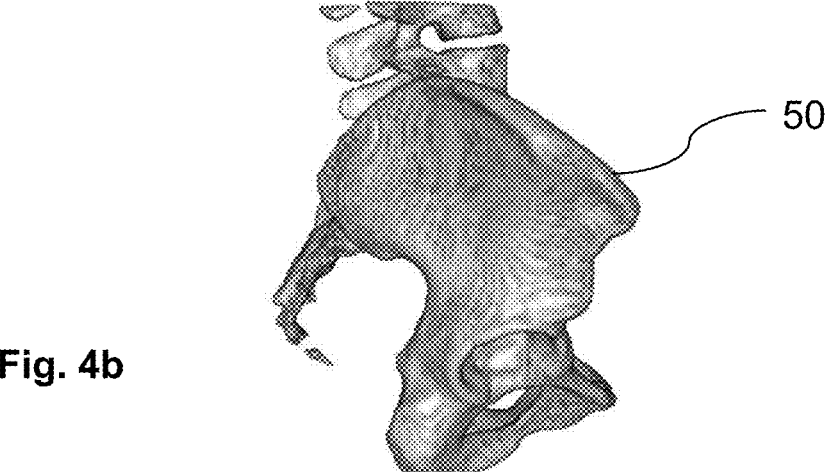
Fig. 4b
50
Fig. 4c
50
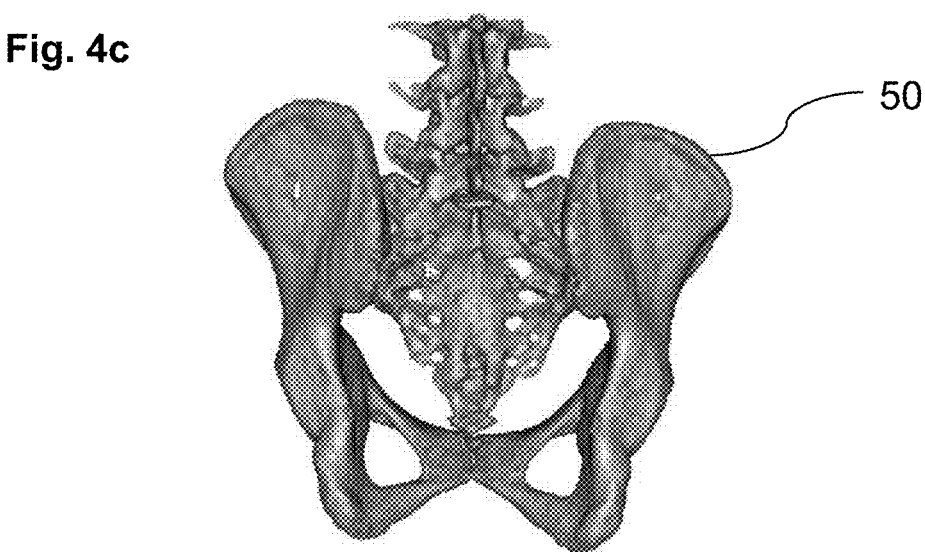

50

50

50

50

50

50

50

METHOD AND DEVICE FOR GENERATING A THREE-DIMENSIONAL SYNTHETIC IMAGE FROM A THREE-DIMENSIONAL INPUT IMAGE

FIELD

The present invention relates to the field of medical image generation.

Beneficially, the invention relates to the generation of images of a part of the body of a subject, and more particularly to a bone portion of the body, especially to a bone portion with complex anatomical specificities, such as the pelvis.

More specifically, the invention relates to a method and a device for generating a three-dimensional synthetic image from a three-dimensional input image. It also relates to a computer program and a computer readable medium storing such a computer program.

BACKGROUND

Methods involving deep neural networks are implemented for image analysis. In particular, deep neural networks are increasingly used in the medical field, for example to help with diagnosis.

In order to make a neural network efficient, a training process must be conducted before implementing the corresponding neural network. Such a training process requires substantial and qualitative datasets in order to ensure good performances of the corresponding neural network.

However, in the medical field, it can be difficult to access a large number of images. Indeed, collecting data is expensive and labor-intensive. Furthermore, privacy concerns of medical data impose restrictions on data sharing. These disadvantages thus limit access to publicly available medical datasets, thus hindering the rapid implementation of cutting-edge methods in the medical and diagnosis fields.

SUMMARY

An aspect of the present invention thus aims at increasing medical datasets that can be used to train neural networks for medical image analysis. The present invention is particularly beneficial for medical images that comprise a bone portion of the body of a patient.

An aspect of the invention relates to a method for generating at least a three-dimensional synthetic image from a three-dimensional input image, the method comprising:
- receiving a three-dimensional input image representing a part of a body of a subject, said part comprising a bone portion,
- converting the three-dimensional input image into a first vector that presents dimensions lower than dimensions of the three-dimensional input image,
- determining, using a diffusion module, a modified vector by applying a diffusion processing to the first vector, the modified vector corresponding to a noisy representation of the first vector, said diffusion module being configured to receive, as input, the first vector and to provide, as output, the modified vector,
- determining, using a reverse diffusion module, a second vector by applying a reverse diffusion processing to the modified vector, the second vector corresponding to a denoised representation of the modified vector, said reverse diffusion module being configured to receive, as input, the modified vector and to provide, as output, the second vector, and
- converting the second vector into a three-dimensional synthetic image that presents the same dimensions as the three-dimensional input image, the three-dimensional synthetic image representing said part of the body of the subject, said part comprising the bone portion.

By "three-dimensional input image", it is meant a real image acquired during the examination of a patient. The real image can be acquired by, e.g., CT-scan.

By "three-dimensional synthetic image", it is meant an image generated by the method of the invention. Said differently, a synthetic image is an image simulated, by the method of the invention, which is not directly obtained from the examination of a patient.

By "vector", it is meant a matrix representation in three dimensions (and not a column vector).

As detailed below, the inventors have developed a method for generating synthetic images from real input images that represent a bone portion of the body of the subject. This generating method enables conserving the anatomical details of the bone portion. Therefore, starting from a real image comprising the bone portion, the method of the invention enables to generate a corresponding synthetic image that conserves the main features of the real image. This enables preserving spatial structure in medical images. This point is crucial in medical imaging as the spatial arrangement of the bone structures is critical in order to perform an accurate diagnosis and analysis.

Until now, to the inventors' knowledge, no one has thought of generating such synthetic images comprising a bone portion and especially representing the pelvis of a subject. According to the knowledge of the inventors, the method of the invention is the first one that is developed to generate efficiently synthetic images of the pelvis.

Furthermore, due to the diffusion processing and the reverse diffusion processing (and the successive noise component addition and removal), a same input image can be used several times to generate a plurality of different synthetic images that will conserve the main features of the input image.

The method according to an aspect of the invention is particularly beneficial for medical images that are CT scans. Indeed, CT scans usually do not present a resolution as good as that of MRI images. Therefore, generating high-quality synthetic images from real CT scans is challenging. As presented in the following, the generating method of the invention enables generating synthetic images from CT scans that preserve all the anatomical details of the concerned bone portion (here the pelvis). Said differently, the method of the invention enables generating synthetic images that reproduce accurately the anatomical details of the concerned bone portion even if the resolution of the input images is not so high. According to the knowledge of the inventors, the method of the invention is the first one that is developed to generate three-dimensional synthetic images from three-dimensional input images presenting a medium quality.

Therefore, the generated synthetic images can be used to enrich the training datasets of neural networks in order to efficiently train the corresponding neural networks that are used in the medical field.

Other non-limiting and beneficial features of the invention, taken individually or according to all the combinations that are technically possible, are the following:

the bone portion is the pelvis;

converting the three-dimensional input image into the first vector is implemented using an encoding part of an artificial neural network, the encoding part is configured to receive, as input, the three-dimensional input image and to provide, as output, the first vector;

converting the second vector into the three-dimensional synthetic image is implemented using a decoding part of the artificial neural network, the decoding part being configured to receive, as input, the second vector and to provide, as output, the three-dimensional synthetic image;

the artificial neural network is an autoencoder;

the diffusion processing comprises a composition of diffusion functions applied to the first vector, each diffusion function corresponding to the addition of a noise component;

the reverse diffusion processing comprises a composition of reverse diffusion functions applied to the modified vector, each diffusion function corresponding to the removal of the noise component;

the noise component is a component with a Gaussian distribution;

each diffusion function corresponds to a Markov chain;

the diffusion processing comprises the application of a plurality of successive Markov chains, two successive Markov chain of the plurality of successive Markov chains being separated by a timestep, the diffusion processing being associated with a number T of timesteps;

the reverse diffusion module comprises a convolutional neural network, the convolutional neural network being configured to implement a corresponding reverse diffusion function;

the number T of timesteps is greater than 100;

the number T of timesteps is greater than 500;

the number T of timesteps is greater than 1000;

the method comprises, previously to converting the three-dimensional input image, pre-processing of the three-dimensional input image, in order to obtain a pre-processed three-dimensional image, the first vector being obtained by converting said pre-processed three-dimensional image;

pre-processing of the three-dimensional input image comprises extracting the part comprising the bone portion such that the pre-processed three-dimensional image is focused on said part comprising the bone portion;

extracting the part comprising the bone portion comprises:

a) segmenting the three-dimensional input image in order to identify said part comprising the bone portion, b) determining a mask corresponding to said part comprising the bone portion based on the segmented three-dimensional input image, and c) generating an intermediate pre-processed three-dimensional image by applying said mask to the three-dimensional input image;

pre-processing of the three-dimensional input image comprises cropping and resizing the intermediate pre-processed three-dimensional image; and pre-processing of the three-dimensional input image comprises performing an adjustment of a spatial orientation of the intermediate pre-processed three-dimensional image.

Another aspect of the invention relates to a method for generating at least a three-dimensional synthetic image from a three-dimensional input image using an image processing device that includes one or more processors, one or more memories including machine executable instructions stored in the one or more memories for implementing a first neural network, a diffusion model and a reverse diffusion neural network, the method comprising:

receiving, by the image processing device, a three-dimensional input image representing a part of a body of a subject, said part comprising a bone portion, converting, by the first neural network, the three-dimensional input image into a first vector that presents dimensions lower than dimensions of the three-dimensional input image, determining, using the diffusion model, a modified vector by applying a diffusion processing to the first vector, the modified vector corresponding to a noisy representation of the first vector, said diffusion model being configured to receive, as input, the first vector and to provide, as output, the modified vector, determining, using the reverse diffusion neural network, a second vector by applying a reverse diffusion processing to the modified vector, the second vector corresponding to a denoised representation of the modified vector, said reverse diffusion neural network being configured to receive, as input, the modified vector and to provide, as output, the second vector, and converting, with the first neural network, the second vector into a three-dimensional synthetic image that presents the same dimensions as the three-dimensional input image, the three-dimensional synthetic image representing said part of the body of the subject, said part comprising the bone portion.

In an embodiment, the converting of the three-dimensional input image into the first vector is carried out by the encoding part of the first neural network.

In an embodiment, the converting of the second vector into the three-dimensional synthetic image is carried out by the decoding part of the first neural network.

In an embodiment, the diffusion model is based on a diffusion function that corresponds to one or more Markov chains.

Another aspect of the invention relates to a method for generating three-dimensional images of a bone portion to train a neural network of a medical image analysis system, the method comprising:

generating at least a three-dimensional synthetic image from a three-dimensional input image using an image processing device that includes one or more processors, one or more memories including machine executable instructions stored in the one or more memories for implementing a first neural network, a diffusion model and a reverse diffusion neural network, the generating comprising:

receiving, by the image processing device, a three-dimensional input image representing a part of a body of a subject, said part comprising the bone portion, converting, by the first neural network, the three-dimensional input image into a first vector that presents dimensions lower than dimensions of the three-dimensional input image, determining, using the diffusion model, a modified vector by applying a diffusion processing to the first vector, the modified vector corresponding to a noisy representation of the first vector, said diffusion model being configured to receive, as input, the first vector and to provide, as output, the modified vector, determining, using the reverse diffusion neural network, a second vector by applying a reverse diffusion processing to the modified vector, the second vector corresponding to a denoised representation of the modified vector, said reverse diffusion neural network being configured to receive, as input, the modified vector and to provide, as output, the second vector, and converting, with the first neural network, the second vector into a three-dimensional synthetic image that presents the same dimensions as the three-dimensional input image, the three-dimensional synthetic image representing said part of the body of the subject, said part comprising the bone portion, and training the neural network of said medical image analysis system with said three-dimensional synthetic image.

In an embodiment, the converting of the three-dimensional input image into the first vector is carried out by the encoding part of the first neural network.

In an embodiment, the converting of the second vector into the three-dimensional synthetic image is carried out by the decoding part of the first neural network.

In an embodiment, the diffusion model is based on a diffusion function that corresponds to one or more Markov chains.

Another aspect of the invention relates to a device for generating at least a three-dimensional synthetic image from a three-dimensional input image, the device comprising a control unit configured to:

receive a three-dimensional input image representing a part of a body of a subject, said part comprising a bone portion, convert the three-dimensional input image into a first vector that presents dimensions lower than dimensions of the three-dimensional input image, determine, using a diffusion module, a modified vector by applying a diffusion processing to the first vector, the modified vector corresponding to a noisy representation of the first vector, said diffusion module being configured to receive, as input, the first vector and to provide, as output, the modified vector, determine, using a reverse diffusion module, a second vector by applying a reverse diffusion processing to the modified vector, the second vector corresponding to a denoised representation of the modified vector, said reverse diffusion module being configured to receive, as input, the modified vector and to provide, as output, the second vector, and convert the second vector into a three-dimensional synthetic image that presents the same dimensions as the three-dimensional input image, the three-dimensional synthetic image representing said part of the body of the subject, said part comprising the bone portion.

Another aspect of the invention relates to an image processing device for generating at least a three-dimensional synthetic image from a three-dimensional input image, the image processing device comprising a control unit that includes one or more processors, one or more memories including machine executable instructions stored in the one or more memories for implementing a first neural network, a diffusion model and a reverse diffusion neural network and for performing the method of:

receiving, by the image processing device, a three-dimensional input image representing a part of a body of a subject, said part comprising a bone portion, converting, by the first neural network, the three-dimensional input image into a first vector that presents dimensions lower than dimensions of the three-dimensional input image,

determining, using the diffusion model, a modified vector by applying a diffusion processing to the first vector, the modified vector corresponding to a noisy representation of the first vector, said diffusion model being configured to receive, as input, the first vector and to provide, as output, the modified vector, determining, using a reverse diffusion neural network, a second vector by applying a reverse diffusion processing to the modified vector, the second vector corresponding to a denoised representation of the modified vector, said reverse diffusion neural network being configured to receive, as input, the modified vector and to provide, as output, the second vector, and converting, by the first neural network, the second vector into a three-dimensional synthetic image that presents the same dimensions as the three-dimensional input image, the three-dimensional synthetic image representing said part of the body of the subject, said part comprising the bone portion.

In an embodiment, the converting of the three-dimensional input image into the first vector is carried out by the encoding part of the first neural network.

In an embodiment, the converting of the second vector into the three-dimensional synthetic image is carried out by the decoding part of the first neural network.

In an embodiment, the diffusion model is based on a diffusion function that corresponds to one or more Markov chains.

An aspect of the invention also provides a computer program comprising instructions executable by a processor and configured such that the processor carries out a method as presented above when these instructions are executed by the processor.

Lastly, the invention provides a (non-transitory) computer readable medium storing such a computer program.

Other features and benefits of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which:

FIGS. 4a, 4b, 4c represent three examples of input images used in the generating method of an embodiment of the invention;

DETAILED DESCRIPTION

The present invention aims at increasing medical datasets that can be used to train neural networks for medical image analysis in order to improve the reliability and the efficiency of such neural networks in this medical context.

In particular, an aspect of the present invention proposes a method for generating three-dimensional synthetic images from three-dimensional input images.

In order to lighten the description, the "three-dimensional synthetic image' is also noted "synthetic image" in the following. The "three-dimensional input image" is also named "input image".

In the present description, an input image corresponds to a real image acquired during the examination of a patient. The input image is thus an original image that is obtained from machines for carrying out medical examinations. As an example, the input images are CT scans that are acquired from a computed tomodensitometry (CT) sources.

On the contrary, a synthetic image corresponds to an image generated by the method of the invention. In other words, a synthetic image corresponds to an image obtained by the method of the invention. The synthetic image comprises the features of an input image without being directly obtained from the examination of a patient. Said differently, a synthetic image is an image simulated, by the method of the invention, on the basis of the input image.

In the following, each image (input image or synthetic image) is represented by a plurality of voxels. A three-dimensional image means here that the image is defined in the form of a matrix. As an example, a mean size of each image is at least 512×512×500 voxels. In an embodiment, the size of each considered image is at least 128×128×128 voxels.

In the present description, a "voxel" corresponds to an elementary volume defined in the corresponding three-dimensional image. A voxel is the tri-dimensional equivalent in a three-dimensional image of a bidimensional pixel in a bidimensional image.

Here, the input image is for example a CT scan.

The present invention is particularly beneficial for medical images that comprise a bone portion of the body of a patient. More particularly, it applies for complex bone portions, that is to say for bone portions with a plurality of anatomical details. In an embodiment, here, the bone portion is the pelvis of the patient (as visible in FIGS. 4*a* to 4*c*). In the following, the invention is illustrated using pelvis images, however the present invention can apply to each bone portion of the body of a patient.

Figure 1:
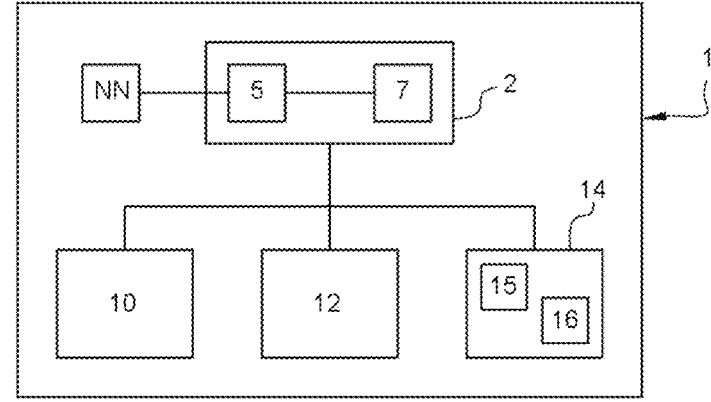
FIG. 1 represents, in a functional form, a device for generating at least a three-dimensional synthetic image from a three-dimensional input image configured to implement a method for generating at least a three-dimensional synthetic image from a three-dimensional input image according to an embodiment of the invention.

FIG. 1 represents, in a functional form, an example of a device 1 for generating at least one synthetic image Ims from an input image Imr configured to implement the present invention.

This device 1 comprises a control unit 2 with a processor 5 and a memory 7. The device 1 can be an image processing device and comprises electronic circuitries to implement its different modules.

The device 1 is configured to implement a set of functional modules. For example, it comprises a training module 10, a pre-processing module 12 and a generating module 14. As visible in FIG. 1, the generating module 14 comprises a diffusion module 15 and a reverse diffusion module 16.

Each of these modules is for instance implemented using a processor executing software instructions corresponding to the module concerned and stored in the memory 7 associated with the processor 5 of the control unit 2. Several modules may in this context be implemented by a same processor, which may execute different software portions respectively corresponding to the various modules. Alternatively, there could more than one memories to store the processor executing software instructions associated with the different modules and more than one processors to execute the processor executing software instructions of the different modules of the device 1. The one or more memories may also be used to store the three-dimensional input images received by the image processing device 1.

As an example, the processor comprises a Central Processing Unit (CPU) and/or a Graphics Processing Unit (GPU). In an embodiment, the device 1 comprises here a CPU and a GPU.

According to a possible alternative, some of the modules may each be implemented by means of a dedicated electronic circuit, such as an Application Specific Integrated Circuit.

The processor 5 is also configured to implement a global artificial neural network NN (also noted global neural network NN in the following), involved in the method for generating the synthetic image Ims from the input image Imr as described in the following.

Figure 2:
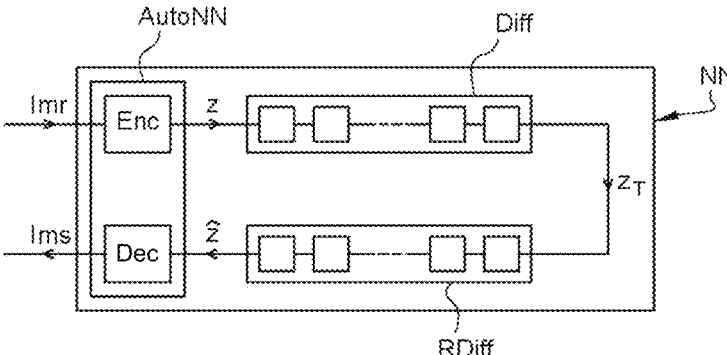
FIG. 2 represents an example of an architecture of a global artificial neural network used in an embodiment of the present invention.

FIG. 2 represents an example of a structure of the global neural network NN implemented in an embodiment of the present invention.

This global neural network NN comprises a first artificial neuronal network AutoNN, a diffusion model Diff and a reverse diffusion network RDiff. Here, the global neural network NN is defined as a generative model.

The first artificial neural network AutoNN is configured to provide, as output, a representation (here an image Ims) that corresponds to the representation provided as input (here an image Imr too) as closely as possible. In practice, this correspondence is assessed by minimizing a cost function based on the output representation and on the input representation.

As visible in FIG. 2, the first artificial neural network AutoNN comprises an encoding part Enc and a decoding part Dec.

The encoding part Enc is a neural network configured to compress the data it receives as input (here the image Imr) while keeping reliable features of the data received as input. In other words, the encoding part Enc is configured to transform input data (here the image Imr) in a representation which is defined in a specific space with lower dimensions (this specific space is usually called "latent space").

Considering that the encoding part Enc receives, here, an image Imr as input, the encoding part Enc is configured to provide, as output, a vector z with lower dimensions than the image Imr received as input. This vector z (also noted "latent vector z" in the following) corresponds to another representation of the image Imr received as input. This other representation retains the most relevant features from the image Imr received as input, that is to say the features that best characterize this image, and with dimensions smaller than that of this image Imr.

According to an embodiment here, the encoding part Enc receives the image Imr as input. The dimensions of this image Imr are for example at least 128×128×128 voxels. In practice, the encoding part Enc gradually reduces the dimensions of the image Imr through a series of layers. The encoding part Enc thus produces the latent vector z, which is a projection of the image Imr in the latent space. The vector z is thus a latent representation of the image Imr. Here, the dimensions of the latent vector z are for example at least 30×24×30 voxels.

The operation of the encoding part Enc can be written in the following way: $z=\sigma(WX+b)$, with X representing the image Imr (X is a matrix representation of the image Imr), W a weight matrix associated with the encoding part Enc, b a bias associated with the encoding part Enc and $\sigma$ an activation function. The activation function $\sigma$ is for example a sigmoid function or a Rectified Linear Unit (commonly noted ReLU) function.

The decoding part Dec works in the opposite way to the encoding part Enc. The decoding part Dec is a neural network configured to construct output data from a vector (noted $\hat{z}$ in FIG. 2) with lower dimensions. In practice, the decoding part Dec is configured to generate an output that is as close as possible as the input provided to the encoding part Enc. The similarities are assessed considering the optimization of a cost function taking into account the output of the decoding part Dec and the input of the encoding part Enc.

In practice, the decoding part Dec is a neural network that is the transpose of the encoding part Enc.

As an example here, the first artificial neural network AutoNN is an autoencoder. In other words, the first artificial neural network AutoNN is trained to provide, as output, an image Ims which is as close as possible of the input image Imr. In an embodiment, first artificial neural network AutoNN can be implemented with the autoencoder(s) described by Bank D., Koenigstein N. and Giryes R., 2020. More details about this type of neural networks can be found in the article "*Autoencoders*" written by Bank D., Koenigstein N. and Giryes R., 2020.

As represented in FIG. 2, the global neural network NN also comprises the diffusion model Diff that is configured to implement a diffusion processing. In an embodiment, the diffusion model Diff is here implemented by the processor 5 of the control unit 2.

More particularly, this diffusion model Diff is configured to determine a modified vector $z_T$ of the latent vector z. In other words, the diffusion model Diff is configured to introduce a noise component $\epsilon_T$ to the latent vector z. Said differently, the diffusion model Diff is configured to perturb the latent vector z with the noise component $\epsilon_T$ in order to obtain a modified vector $z_T$ that represents a noisy representation of the input image Imr.

Here, in an embodiment, the noise component $\epsilon_T$ is for example a component with a Gaussian distribution.

In a practical application, the diffusion model Diff is based on a diffusion function that corresponds to a Markov chain applied on the latent vector z.

Here, the diffusion model Diff is configured to perturb the latent vector z based on a composition of diffusion functions applied to the latent vector z. Each diffusion function corresponds to the addition of a noise component $\epsilon_T$. Therefore, the diffusion model Diff is configured to perturb the latent vector z through the introduction of a plurality of noise components $\epsilon_T$. In other words, the diffusion model Diff is configured to introduce a plurality of successive noise components $\epsilon_T$ to the latent vector z.

The operation implemented (i.e the composition of diffusion functions) in the diffusion model Diff can be written n as followed: $p(z_T|z)=p(z_1|z) \; . \; . \; . \; p(z_t|z_{t-1}) \; . \; . \; . \; p(z_T|z_{T-1})=\Pi_{t=1}^{T}(z_t|z_{t-1})$, with intermediate latent vectors $z_t$ in which successive noise components $\epsilon_T$ are introduced, and $p(z_t|z_{t-1})$ a transition distribution associated with the introduction of the noise component between the intermediate latent vector $z_{t-1}$ and the following obtained latent vector $z_t$.

In practice, each introduction of the noise component is here implemented through a Markov chain (that is to say that each diffusion function corresponds to a Markov chain).

More particularly, in order to introduce successively a plurality of noise components $\epsilon_T$, the diffusion model Diff comprises the application of successive Markov chains. Two successive Markov chains (of the plurality of the Markov chains) are separated by a timestep. In practice, a Markov chain is applied to the intermediate latent vector $z_{t-1}$ and provides, as output, the other intermediate latent vector $z_t$ corresponding to the intermediate latent vector $z_{t-1}$ in which the noise component $\epsilon_T$ is introduced.

Here, the diffusion model Diff comprises a number T of timesteps. In other words, a Markov chain is applied T times in order to perform the addition of the noise component $\epsilon_T$ T times. This number T is greater than 100. In an embodiment, this number T is greater than 500. Even more desirably, the number T is greater than 1000. Using a plurality of application of Markov chains is greatly beneficial as it enables to ensure that the latent vector z is "completely destroyed" and replaced by a corresponding noisy representation.

The diffusion model Diff is coupled to the reverse diffusion network RDiff. The reverse diffusion network RDiff is configured to recover a latent vector associated with the input image Imr from the modified vector $z_T$ (associated with the noisy representation). In other words, the reverse diffusion network RDiff is configured to remove the noise component $\epsilon_T$ that was introduced by the diffusion model Diff. Said differently, the reverse diffusion network RDiff is configured to denoise the modified vector $z_T$ in order to restore the original features of the latent vector z (and of the input image Imr).

In practice, the reverse diffusion network RDiff is configured to apply the inverse transformation (to the modified vector $z_T$) that the one that was applied to the latent vector z by the diffusion model Diff, in order to obtain a restored vector $\hat{z}$.

The reverse diffusion network RDiff comprises a multi-step chain applied to the modified vector $z_T$.

Here, the reverse diffusion network RDiff is configured to restore the original features of the latent vector z, generating the restored vector $\hat{z}$, by removing recursively the noise components $\epsilon_T$ that were introduced by the diffusion model Diff. In practice, the reverse diffusion network RDiff is configured to apply a composition of reverse diffusion functions to the modified vector $z_T$. Each reverse diffusion function corresponds to the removal of the noise component $\epsilon_T$. In other words, the reverse diffusion network RDiff is configured to iteratively remove the noise component $\epsilon_T$ from the modified vector $z_T$. Said differently, the modified vector $z_T$ is denoised by a plurality of successive denoising operations. The restored vector $\hat{z}$ is thus a denoised version of modified vector $z_T$.

Each denoising operation aims at removing the noise component $\epsilon_T$ to an intermediate modified vector $z_{Ti}$.

In practice, each removal of the noise component is here implemented through a convolutional neural network. In other words, in order to remove successively a plurality of noise components $\epsilon_T$, the reverse diffusion network RDiff comprises a plurality of convolutional neural networks that are implemented successively. Each convolutional neural network receives, as input, the intermediate modified vector $z_{Ti-1}$ and provides, as output, another intermediate modified vector $z_{Ti}$ corresponding to the intermediate modified vector $z_{Ti-1}$ in which the noise component $\epsilon_T$ is removed.

In a practical implemental, the convolutional neural network is here a U-Net network.

In order to remove all the noise components that were introduced by the diffusion model Diff and to recover the original features of the latent vector z (that is to say to compensate for the T applications of the Markov chain(s) that introduced previously the plurality of noise components $\epsilon_T$), the reverse diffusion network RDiff comprises the same number T of convolutional neural networks. As indicated previously, this number T is greater than 100. In an embodiment, this number is greater than 500. Even more desirably, the number T is greater than 1000.

Finally, the association of the diffusion model Diff and the reverse diffusion network RDiff enables to continuously perturbed the latent vector z (representing the main features of the input image Imr) by adding a noise component (here with a Gaussian distribution for example) in order to obtain a modified vector $z_T$ of the latent vector z corresponding to a noisy representation of the latent vector z and then to reverse this process to generate the restored vector $\hat{z}$ that presents the original features of the latent vector z.

Figure 3:
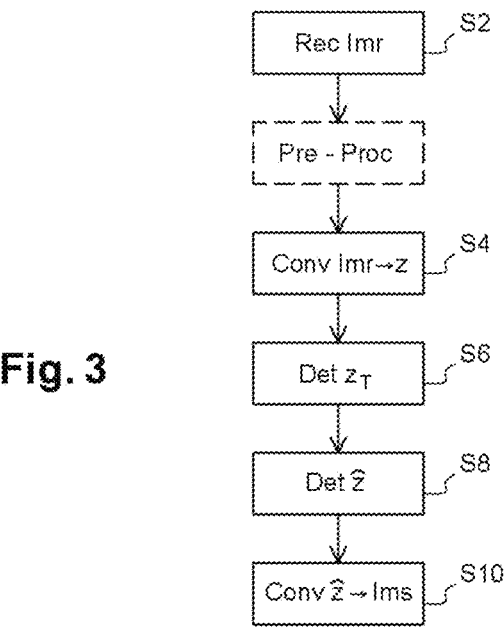
FIG. 3 represents an exemplary flowchart of the method for generating at least a three-dimensional synthetic image from a three-dimensional input image according to an embodiment of the invention.

The device 1 and the global neural network NN previously introduced are used to implement the method for generating at least a synthetic image Ims from the input image Imr. FIG. 3 is a diagram showing steps of an example of the method for generating at least a synthetic image Ims from the input image Imr according to the present invention.

Prior to implementing the generating method according to an aspect of the invention, a preliminary method is implemented in order to train the global neural network NN.

More particularly, this preliminary method is implemented in order to train the different parts of the global neural network NN, that is to say the first artificial neural network AutoNN and the reverse diffusion network RDiff.

In practice here, the first artificial neural network AutoNN is trained separately from the reverse diffusion network RDiff.

The first artificial neural network AutoNN is trained using reference images which comprise the concerned bone portion of the body of the subject. For example, such reference images comprise the pelvis. These reference images are for example images obtained during the examination of patients.

The preliminary method thus consists in adjusting the weights of the nodes of the first artificial neural network AutoNN in order to reduce the difference between the images obtained as the output of the first artificial neural network AutoNN (when the reference images are provided as input) and the reference images.

In practice here, the training of the first artificial neural network AutoNN consists of optimizing loss functions such as the L1 loss function, the perceptual loss function and the KL (Kullback-Leibler) regularization function. The optimization of these loss functions is implemented using an Adam optimizer with for example a learning rate equal to $1.10^{-4}$.

Training the first artificial neural network AutoNN involves repeating the weight adjustment many times, while also successively applying a plurality of distinct reference images. A plurality of training epochs is thus performed to train the first artificial neural network AutoNN. The number of training epochs is for greater than 500, and in an embodiment, greater than 1000. Performing at least 2000 training epochs enables to determine optimal hyperparameters (such as the weights of nodes, the batch size and the learning rate) of the first artificial neural network AutoNN.

The preliminary method is also implemented in order to train the reverse diffusion network RDiff.

For this purpose, the diffusion model Diff and the reverse diffusion network RDiff are performed using reference latent vectors which are associated with reference images which comprise the concerned bone portion of the body of the subject. Here, the reference latent vectors are for example associated with the reference images used to train the first artificial neural network AutoNN (as described previously). Beneficially according to an aspect of the present invention, the reference latent vectors are associated with the pelvis. The global neural network NN is therefore optimally trained to handle images representing the pelvis of the subject. As an alternative, if another bone portion is considered, the reference images are adapted to this other considered bone portion.

The preliminary method thus consists in adjusting the weights of the nodes of the reverse diffusion network RDiff in order to reduce the distance between the restored vectors obtained as output of the reverse diffusion network RDiff (when the reference latent vectors are provided as input of the diffusion model Diff) and the corresponding reference latent vectors. In other words, during the preliminary method, the weights of the nodes of the reverse diffusion network RDiff are adjusted so that the restored vectors (obtained as output of the reverse diffusion network RDiff) converge towards the reference latent vectors (provided as input of the diffusion model Diff).

Training the reverse diffusion network RDiff involves repeating the weight adjustment many times, while also successively applying a plurality of distinct reference modified vectors as input of the reverse diffusion model Diff (the reference modified vectors are for example associated with corresponding reference latent vectors). A plurality of training epochs is thus performed to train the diffusion model Diff and the reverse diffusion network RDiff. The number of training epochs is for example greater than 500, and in an embodiment, greater than 1000. Preforming at least 2000 training epochs enables to determine optimal hyperparameters (such as the weights of nodes) of the reverse diffusion network RDiff.

The method for generating a synthetic image Ims from an input image Imr (also noted "generating method" in the following) is thus implemented following the introduced preliminary method.

The generating method is for example implemented by the processor 5 of the control unit 2. In a general way, the generating method is computer-implemented.

As represented in FIG. 3, the generating method begins with a step Rec of receiving at least one input image Imr. This input image Imr represents a part of the body of a subject which comprises a bone portion 50 of the body. Here, the bone portion 50 is the pelvis 50 of the subject.

Figure 4A:
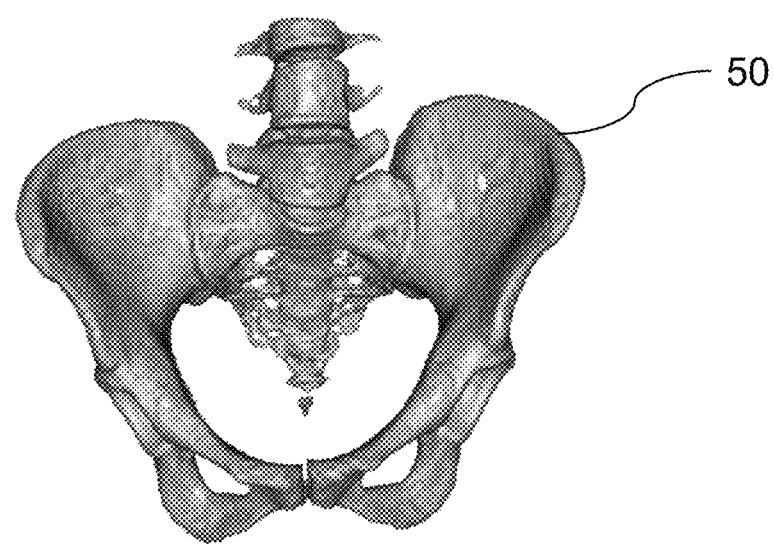

FIGS. 4a to 4c shows three examples of input images representing the pelvis 50 of the subject.

In practice, a plurality of input images Imr are received by the processor 5 of the control unit 2. This plurality of input images Imr is for example stored in the memory 7 of the control unit 2. For sake of clarity, the generating method is described considering only one input image Imr but this generating method applies in the same way to all the input images Imr of the plurality of input images Imr.

Figure 5:
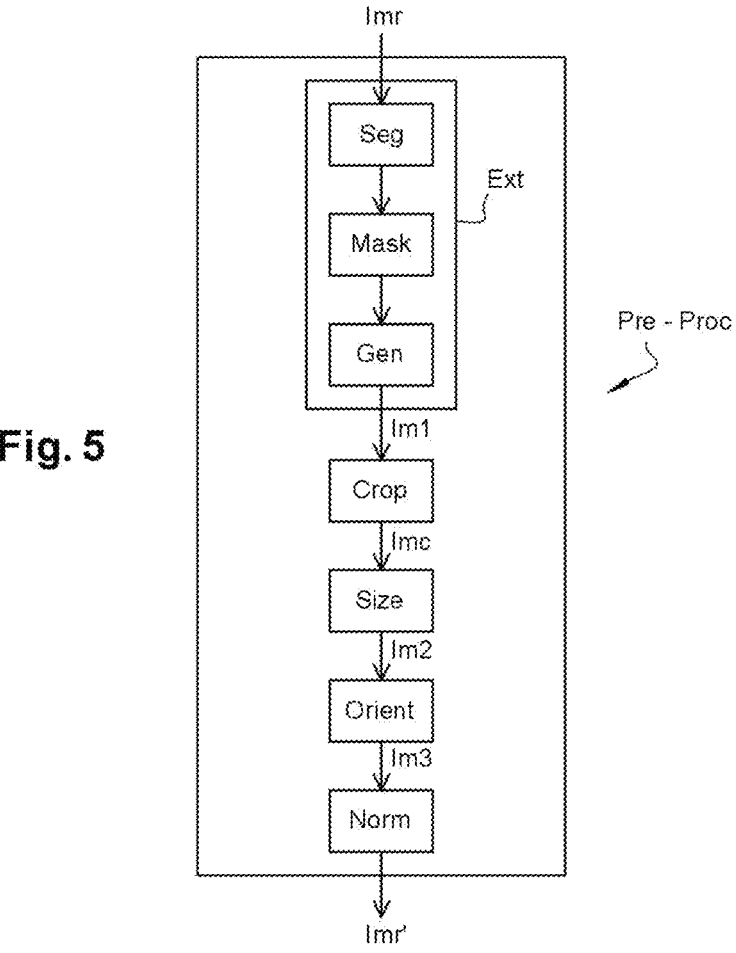
FIG. 5 represents an exemplary flowchart of a pre-processing treatment according to an embodiment of the invention.

The generating method then comprises a pre-processing treatment Pre-Proc of the input image Imr. The pre-processing treatment Pre-Proc aims at processing the input image Imr in order to make the following steps of the generating method more efficient. The pre-processing treatment Pre-Proc is here configured to obtain a pre-processed version of the input image Imr (also called pre-processed image Imr' in the following). FIG. 5 is a diagram showing the successive steps of an example of the pre-processing treatment Pre-Proc according to the present invention.

As visible in FIG. 5, the pre-processing treatment Pre-Proc first comprises a step Ext of extracting the part comprising the bone portion 50 (here the pelvis) such that the pre-processed image Imr' is focused on this part of the body comprising the bone portion 50.

In practice, this extracting step Ext comprises a step Seg of segmenting the input image Imr in order to identify the part comprising the bone portion 50. In practice, this segmenting step Seg is implemented using a segmenting convolutional neural network. This segmenting convolutional neural network is configured to identify different anatomical regions such as soft tissues and bone portions and highlight the bone portions.

The segmenting convolutional neural network is here configured to receive the input image Imr and to provide, as output, a plurality of multi-class masks. The wording "multi-class" means here that each class is associated with a corresponding anatomical region. The segmenting convolutional neural network is thus configured to predict a multi-class mask corresponding to bone portions (for example here to the pelvis).

In a practical implementation, the segmenting convolutional neural network is here a U-Net network.

It is noted here that the segmenting convolutional neural network may also be trained before the implementation of the generating method. For example, the segmenting convolutional neural network is trained during the preliminary method described previously.

Beneficially according to the present invention, the segmenting convolutional neural network is trained using the reference images introduced previously. Such reference images beneficially comprise the pelvis. These reference images are for example images obtained during the examination of patients.

Figure 6:
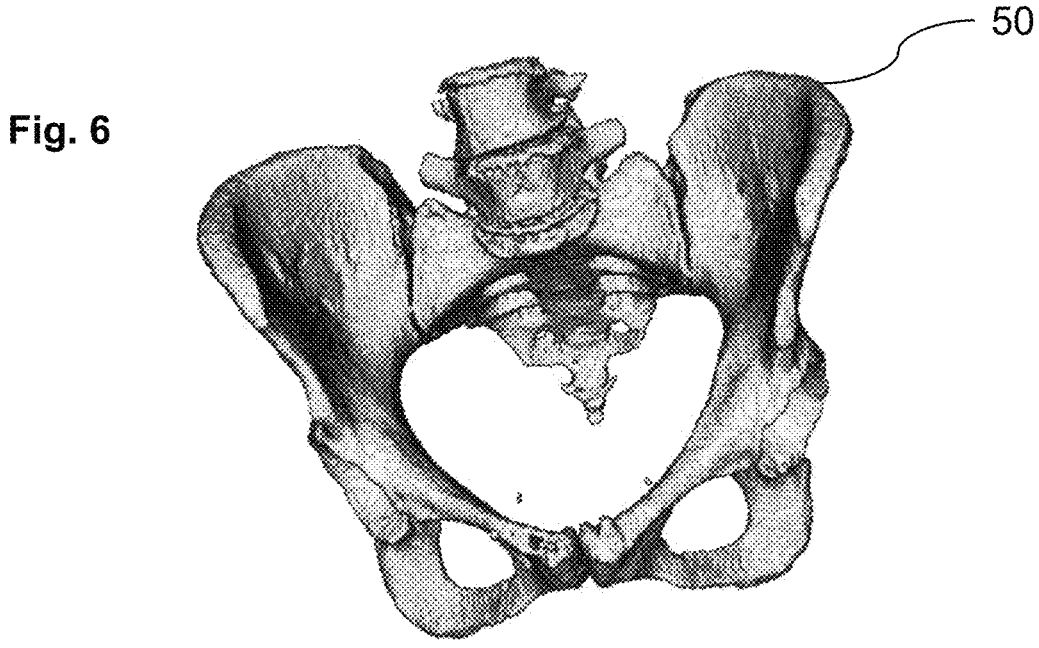
FIG. 6 shows an example of a binary mask obtained during the implementation of the pre-processing treatment of FIG. 5.

As visible in FIG. 5, the pre-processing treatment Pre-Proc then comprises a step Mask of determining a binary mask corresponding to the part comprising the bone portion. This binary mask is obtained based on the multi-class mask predicted (for the bone portions) by the segmenting convolutional neural network at the segmenting step Seg. In other words, here, the processor 5 of the control unit 2 convert the multi-class mask predicted for the bone portions into a binary mask. This step enables determining a mask focusing only the bone portion (here the pelvis). FIG. 6 shows an example of such binary mask.

Finally, the extracting step Ext comprises a step Gen of generating an intermediate pre-processed image Im1 based on this determined binary mask. More particularly, the processor 5 of the control unit 2 generates the intermediate pre-processed image Im1 by applying the determined binary mask to the input image Imr. More particularly, the intermediate pre-processed image Im1 is obtained by multiplying the determined binary mask and the input image Imr. This step Gen enables eliminating the other anatomical regions which are not of interest here (as the generating method focuses on bone portions). In other words, the bone portion is extracted thanks to the multiplication of the determined binary mask and the input image Imr.

Figures 7, 8:
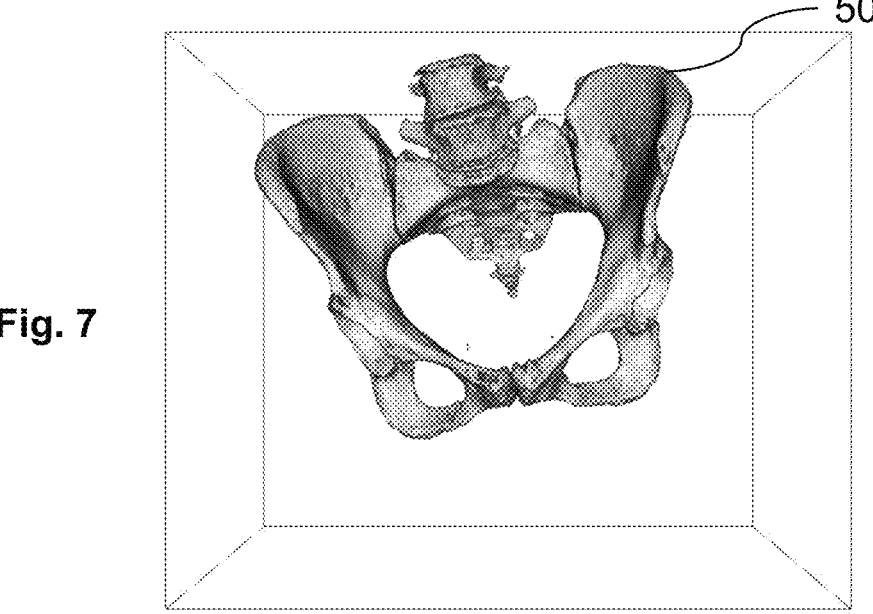
FIG. 7 shows an example of a first intermediate pre-processed image obtained after an extracting step of the pre-processing treatment of FIG. 5.
FIG. 8 shows an example of a second intermediate pre-processed image obtained after cropping and resizing steps of the pre-processing treatment of FIG. 5.

Thanks to this this extracting step Ext, the input image Imr is modified in order to be focused on this part of the body comprising the bone portion 50 (as indicated, the other anatomical regions are eliminated from the pre-processed image Imr'). FIG. 7 shows an example of an intermediate pre-processed image Im1 obtained after the extracting step Ext.

As represented in FIG. 5, the pre-processed treatment Pre-Proc then comprises a step Crop of cropping the intermediate pre-processed image Im1 obtained after the extracting step Ext. At this step, the processor 5 of the control unit 2 performs a central cropping of the intermediate pre-processed image Im1 obtained after the extracting step Ext. In other words, the intermediate pre-processed image Im1 is cut in order to keep the representation of the bone portion and tens of voxels around the bone portion 50 (in order to obtain the desired dimensions for the pre-processed image Imr', for example the dimensions of 128×128×128 voxels). This cropping step Crop aims at removing irrelevant parts of the intermediate pre-processed image Im1 obtained after the extracting step Ex and subsequently enables reducing the size of the cropped image Imc.

The pre-processed treatment Pre-Proc then comprises a step Size of resizing the cropped image Imc in order to uniformize the size of the images that are involved in the generating method. As an example, the processor 5 of the control unit 2 resamples the cropped image Imc to a uniform size of 128×128×128 voxels (using a standard voxel spacing of 1.5×1.5×1.5). FIG. 8 shows an example of another intermediate pre-processed image Im2 obtained after cropping and resizing steps. The frame represented in FIGS. 7 and 8 illustrates the reduction of the image after cropping and resizing steps.

As visible in FIG. 5, the pre-processed treatment Pre-Proc also comprises a step Orient of adjusting the spatial orientation of the part comprising the bone portion 50. More particularly, the processor 5 of the control unit 2 adjusts the spatial orientation of the part comprising the bone portion 50 in order to get a predetermined orientation of this part. This spatial orientation is adjusted in the standard RAS (for Right, Anterior, Superior) orientation system. More explicitly, this RAS orientation system means that the first dimension points towards the right-hand side of the bone portion (here the pelvis), the second dimension points towards the Anterior aspect of the bone portion, and the third dimension points towards the top of the bone portion. The directions are considered to be from the subject's perspective. FIGS. 4a to 4c show examples of input images (with the bone portion being the pelvis) in three different anatomical orientations.

Figure 9:
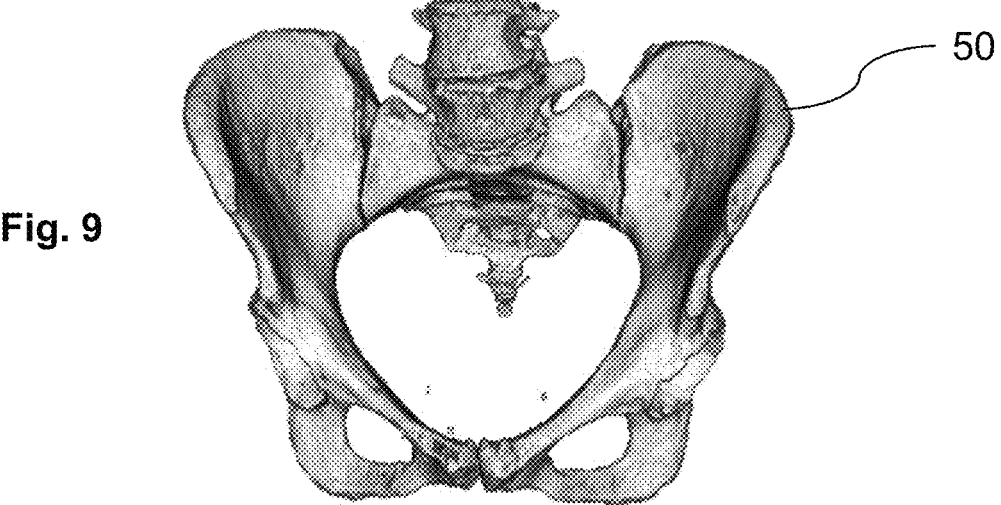
FIG. 9 shows an example of a third intermediate pre-processed image obtained after a step of adjusting the spatial orientation of the pre-processing treatment of FIG. 5.

This adjusting step Orient aims at adjusting the orientation of the images in order to ensure consistency in spatial alignment during the implementation of the generating method, thus improving the efficiency of this generating method. FIG. 9 shows an example of an intermediate pre-processed image Im3 obtained after the step Orient of adjusting the spatial orientation.

Finally, the pre-processing treatment Pre-Proc comprises a step Norm of normalizing the intensity of the intermediate pre-processed image Im3. This normalizing step Norm aims at scaling the intensity associated with the voxels of the intermediate pre-processed image Im3 between 0 and 1. In practice, the very high intensities are filtered using known filter(s) in order to eliminate potential anomalies and artifacts.

Figure 10:
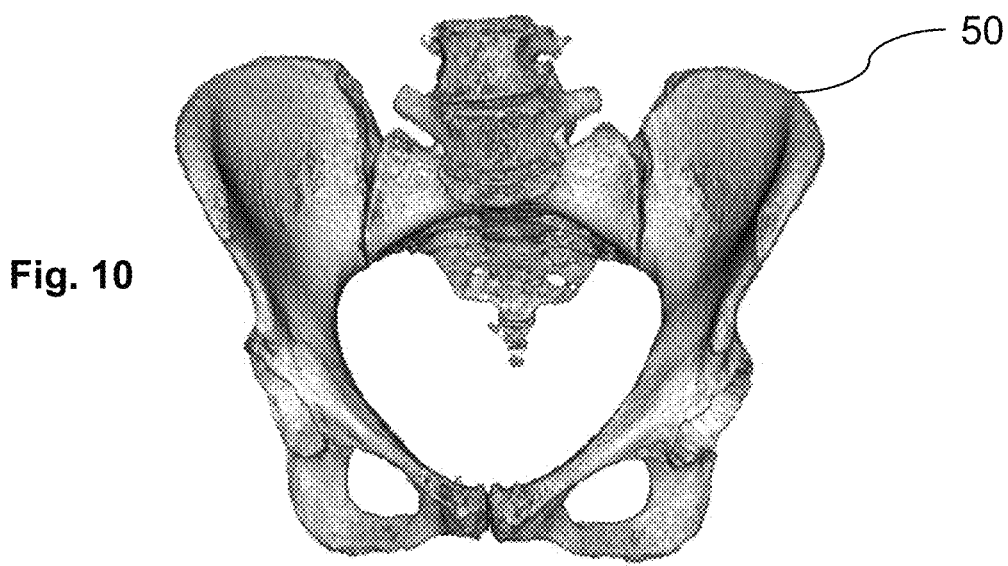
FIG. 10 shows an example of a pre-processed image obtained by the implementation of the pre-processing treatments of FIG. 5.

The pre-processed image Imr' is obtained after this normalizing step Norm. FIG. 10 shows an example of the pre-processed image Imr'.

It will be appreciated that the pre-processed treatment is particularly beneficial because it allows input images acquired by different examination systems, which do not have the same format or the same acquisition features, to be standardized. This uniformization of the input images allows improving the efficiency of the implementation of the generating method.

Furthermore, the pre-processed treatment enables reducing the size of the images that are stored in the memory 7 of the control unit 2 and that are processed in the generating method, thus preserving memory and computational resources.

It is to be noted that the pre-processing treatment is optional. If it is implemented, the following steps of the generating method are implemented on the pre-processed image Imr'. If it is not implemented, the following steps of the generating method are directly implemented on the input image Imr.

As represented in FIG. 3, the generating method then comprises a step S4 of converting the input image Imr (or the pre-processed image Imr') into a latent vector z. This converting step S4 is implemented thanks to the encoding part Enc of the first artificial neural network AutoNN described previously. The latent vector z thus presents dimensions that are lower than the dimensions of the input image Imr (or of the pre-processed image Imr'). Here, the dimensions of the latent vector z are for example 30×24×30 voxels (whereas the dimensions of the input image Imr are 512×512×500 voxels and the dimensions of the pre-processed image Imr' are 128×128×128 voxels).

The generating method then continues with a step S6 of determining a modified vector $z_T$ by applying a diffusion processing to the latent vector z. The diffusion processing uses here the diffusion model Diff (which is implemented by the processor 5 of the control unit 2). As described previously, the diffusion processing aims at adding a noise component $\epsilon_T$ to the latent vector z in order to obtain a noise representation of this latent vector z.

More particularly here, as described previously, the diffusion process comprises the composition of diffusion functions that is applied to the latent vector z. Each diffusion function corresponds to the addition of the noise component $\epsilon_T$. Each diffusion function is here implemented through a Markov chain (as previously described). As indicated previously, the noise component $\epsilon_T$ is for example here a component with a Gaussian distribution.

Therefore, after this determining step S6, the output of the diffusion module is a noisy representation of the latent vector z (this noisy representation is represented by the modified vector $z_T$).

The generating method then comprises the step S8 of determining the restored vector $\hat{z}$ by applying a reverse diffusion processing to the modified vector $z_T$. The reverse diffusion processing is here implemented by the reverse diffusion network RDiff. As described previously, the reverse diffusion processing aims at removing recursively the noise components $\epsilon_T$ that were introduced by the diffusion model Diff in order to restore the original features of the latent vector z (thus generating the restored vector $\hat{z}$). During this reverse diffusion processing, the modified vector $z_T$ is denoised by a plurality of successive denoising operations. The restored vector $\hat{z}$ is thus a denoised representation of the modified vector $z_T$.

More particularly here, as described previously, the reverse diffusion process comprises the composition of reverse diffusion functions that is applied to the modified vector $z_T$. Each reverse diffusion function corresponds to the removal of the noise component $\epsilon_T$. Each reverse diffusion function is here implemented by a corresponding convolutional neural network (previously described).

Therefore, after this determining step S8, the output of the reverse diffusion module is the restored vector $\hat{z}$ that comprises the original features of the latent vector z. The restored vector $\hat{z}$ presents the same dimensions as the latent vector z.

As represented in FIG. 3, the generating method finally comprises a step S10 of converting the restored vector $\hat{z}$ into a synthetic image Ims. This converting step S10 is implemented thanks to the decoding part Dec of the first artificial neural network AutoNN described previously. The synthetic image Ims presents the same dimensions as the input image Imr (or as the pre-processed image Imr'). Here, the dimensions of the synthetic image Ims are for example 512×512×500 voxels (or 128×128×128 voxels).

Figure 11A:
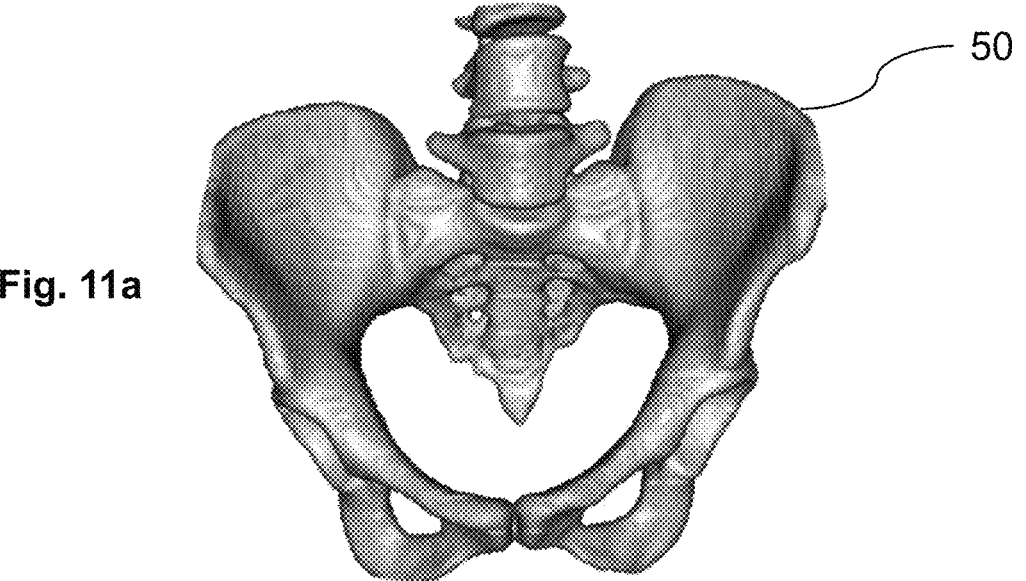
FIGS. 11*a* to 11*c* represent examples of synthetic images generated by the generating method of FIG. 3.
Figure 11B:
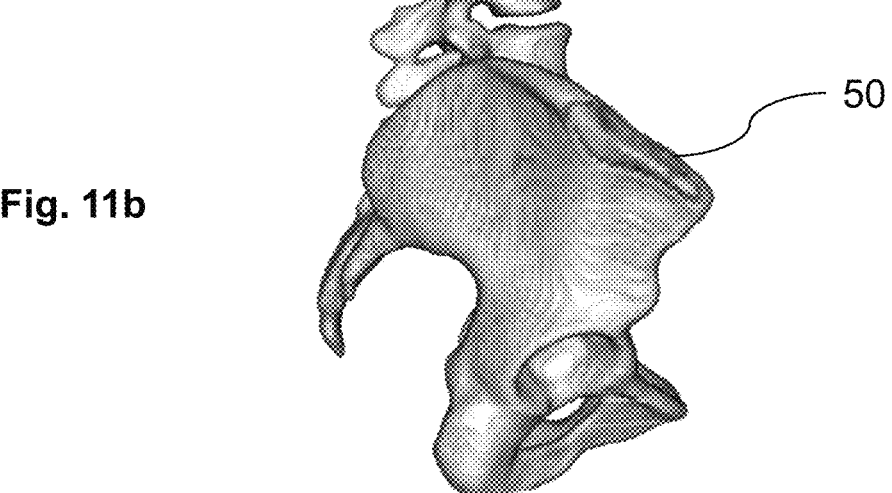
Figure 11C:
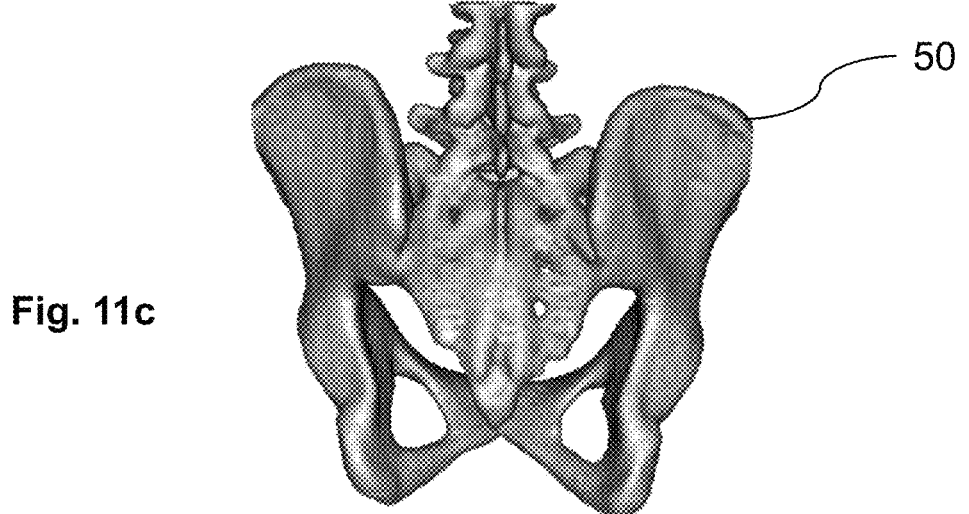

Beneficially according to the present invention, the synthetic image Ims represents the part of the body of the subject that comprises the bone portion 50. Here, the synthetic image Ims represents the pelvis 50. FIGS. 11a to 11c represents examples of synthetic images generated respectively from input images represented in FIGS. 4a to 4c.

Comparing input images of FIGS. 4a to 4c to respective generated synthetic images represented in FIGS. 11a to 11c, it can be seen that the method of an aspect of the invention enables preserving the anatomical details of the pelvis. Therefore, starting from a real image comprising the bone portion 50, the invention enables to generates a corresponding synthetic image that preserve the main features of the real image. It enables preserving spatial structure in medical images. This point is crucial in medical imaging as the spatial arrangement of the bone structures is critical in order to perform an accurate diagnosis and analysis. According to the knowledge of the inventors, the method of the invention is the first one that is developed to generate efficiently synthetic images of the pelvis.

The method according to an aspect of the invention is particularly beneficial for medical images that are CT scans. Indeed, CT scans are three-dimensional images that usually do not present a resolution as good as that of MRI images for example. Therefore, generating high-quality synthetic images from real CT scans is challenging (high-quality images correspond here to images in which all the anatomical details are preserved).

According to an aspect of the invention, the generating method enables generating synthetic images from CT scans that preserve all the anatomical details of the concerned bone portion (here the pelvis). Said differently, the method of the invention enables generating three-dimensional synthetic images that reproduce accurately the anatomical details of the concerned bone portion even if the resolution of the input images is not so high.

Beneficially, the method according to the invention enables maintaining all main features of the input images while decreasing the size (linked to the memory) of the generated synthetic images of at least hundred times. As an example, input images present a size of around 110 Mo whereas the size of the corresponding synthetic images is around 820 ko.

Furthermore, in practice, due to the diffusion processing and the reverse diffusion processing (and the successive noise component addition and removal), a same input image can be used several times to generate a plurality of different synthetic images that will preserve the main features of the input image.

The similarities between the input images and the corresponding generated synthetic images can be quantitatively assessed by a statistical analysis. As an example, the Kullbach-Leibler (KL) divergence values and the Euclidean distance values are evaluated for a plurality of couples of input and corresponding generated synthetic images. It is to be noted here that the generating method was implemented using more than 430 input images (here CT scans) coming from medical examinations carried out on patients.

For example, for five couples, the KL divergence values are comprised between 0.00511 and 0.01071. The KL divergence values are thus close to zero, suggesting that the distributions of voxels between the input (i.e. original) and synthetic images are slightly different from a statistical standpoint. This indicates that the distribution of voxel values in the generated synthetic image is very close to that of the real image.

Considering the Euclidian distance for the same five couples, the values of this Euclidian distance are comprised between 0.12656 and 0.18573. These values of the Euclidean distance illustrate relatively high proximities between the voxels of the generated images and the ones of the real images.

Such statistical analyses demonstrate the great efficiency of the method of the invention to generate synthetic images that are highly similar to the real images that are used for their generation. The generated synthetic images present the advantages to conserve the anatomical details and main features of the original images.

Beneficially, the generated synthetic images can thus be used to enrich the training datasets in order to efficiently train the neural networks that are used in the medical field.

It will be appreciated that the various embodiments and aspects of the inventions described previously are combinable according to any technically permissible combinations.

The articles "a" and "an" may be employed in connection with various elements, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The invention claimed is:

1. A method for generating at least a three-dimensional synthetic image from a three-dimensional input image, the method comprising:
 receiving the three-dimensional input image representing a part of a body of a subject, said part comprising a bone portion,
 converting the three-dimensional input image into a first vector that presents dimensions lower than dimensions of the three-dimensional input image,
 determining, using a diffusion module, a modified vector by applying a diffusion processing to the first vector, the modified vector corresponding to a noisy representation of the first vector, said diffusion module being configured to receive, as input, the first vector and to provide, as output, the modified vector,
 determining, using a reverse diffusion module, a second vector by applying a reverse diffusion processing to the modified vector, the second vector corresponding to a denoised representation of the modified vector, said reverse diffusion module being configured to receive, as input, the modified vector and to provide, as output, the second vector, and
 converting the second vector into a three-dimensional synthetic image that presents the same dimensions as the three-dimensional input image, the three-dimensional synthetic image representing said part of the body of the subject, said part comprising the bone portion.

2. The method according to claim 1, wherein the bone portion is the pelvis.

3. The method according to claim 1, wherein the converting of the three-dimensional input image into the first vector is implemented using an encoding part of an artificial neural network, the encoding part is configured to receive, as input, the three-dimensional input image and to provide, as output, the first vector, and
 wherein the converting of the second vector into the three-dimensional synthetic image is implemented using a decoding part of the artificial neural network, the decoding part being configured to receive, as input, the second vector and to provide, as output, the three-dimensional synthetic image.

4. The method according to claim 3, wherein the artificial neural network is an autoencoder.

5. The method according to claim 1, wherein the diffusion processing comprises a composition of diffusion functions applied to the first vector, each diffusion function corresponding to the addition of a noise component, and wherein the reverse diffusion processing comprises a composition of reverse diffusion functions applied to the modified vector, each diffusion function corresponding to the removal of the noise component.

6. The method according to claim 5, wherein the noise component is a component with a Gaussian distribution.

7. The method according to claim 5, wherein each diffusion function corresponds to a Markov chain, the diffusion procession processing comprising the application of a plurality of successive Markov chains, two successive Markov chains of the plurality of successive Markov chains being separated by a timestep, the diffusion processing being associated with a number T of timesteps, and
 wherein the reverse diffusion module comprises a convolutional neural network being configured to implement a corresponding reverse diffusion function.

8. The method according to claim 7, wherein the number T of timesteps is greater than 100.

9. The method according to claim 8, wherein the number T of timesteps is greater than 500.

10. The method according to claim 9, wherein the number T of timesteps is greater than 1,000.

11. The method according to claim 1 further comprising, prior to converting the three-dimensional input image, preprocessing the three-dimensional input image, in order to obtain a pre-processed three-dimensional image, the first vector being obtained by converting said pre-processed three-dimensional image.

12. The method according to claim 11, wherein preprocessing of the three-dimensional input image comprises extracting the part comprising the bone portion such that the pre-processed three-dimensional image is focused on said part comprising the bone portion.

13. The method according to claim 12, wherein extracting the part comprising the bone portion comprises:

segmenting the three-dimensional input image in order to identify said part comprising the bone portion, determining a mask corresponding to said part comprising the bone portion based on the segmented three-dimensional input image, and generating an intermediate pre-processed three-dimensional image by applying said mask to the three-dimensional input image.

14. The method according to claim 13, wherein pre-processing the three-dimensional input image comprises cropping and resizing the intermediate pre-processed three-dimensional image.

15. The method according to claim 12, wherein pre-processing of the three-dimensional input image comprises performing an adjustment of a spatial orientation of the intermediate pre-processed three-dimensional image.

16. A non-transitory computer readable medium comprising instructions executable by a processor and configured such that the processor carries out a method according to claim 1.

17. A device for generating at least a three-dimensional synthetic image from a three-dimensional input image, the device comprising a control unit configured to:

receive a three-dimensional input image representing a part of a body of a subject, said part comprising a bone portion, convert the three-dimensional input image into a first vector that presents dimensions lower than dimensions of the three-dimensional input image, determine, using a diffusion module, a modified vector by applying a diffusion processing to the first vector, the modified vector corresponding to a noisy representation of the first vector, said diffusion module being configured to receive, as input, the first vector and to provide, as output, the modified vector, determine, using a reverse diffusion module, a second vector by applying a reverse diffusion processing to the modified vector, the second vector corresponding to a denoised representation of the modified vector, said reverse diffusion module being configured to receive, as input, the modified vector and to provide, as output, the second vector, and convert the second vector into a three-dimensional synthetic image that presents the same dimensions as the three-dimensional input image, the three-dimensional synthetic image representing said part of the body of the subject, said part comprising the bone portion.

\* \* \* \* \*